US010769899B2

(12) United States Patent
Dureau

(10) Patent No.: US 10,769,899 B2
(45) Date of Patent: *Sep. 8, 2020

(54) METHODS, SYSTEMS, AND MEDIA FOR PROJECTING LIGHT TO INDICATE A DEVICE STATUS

(71) Applicant: Google LLC, Mountain View, CA (US)

(72) Inventor: Vincent Dureau, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,244

(22) Filed: Aug. 29, 2019

(65) Prior Publication Data
US 2020/0058202 A1 Feb. 20, 2020

Related U.S. Application Data

(63) Continuation of application No. 16/174,773, filed on Oct. 30, 2018, now Pat. No. 10,403,101, which is a (Continued)

(51) Int. Cl.
*G08B 5/38* (2006.01)
*G08B 5/36* (2006.01)
*H04N 5/64* (2006.01)
*H04N 21/442* (2011.01)
*H05B 47/105* (2020.01)
(Continued)

(52) U.S. Cl.
CPC ............... *G08B 5/38* (2013.01); *G08B 5/36* (2013.01); *H04N 5/64* (2013.01); *H04N 21/44218* (2013.01); *H05B 47/105* (2020.01); *G08B 7/06* (2013.01); *H04W 4/80* (2018.02); *H04W 8/005* (2013.01)

(58) Field of Classification Search
CPC ..... G08B 5/38; G08B 5/36; G08B 7/06; H04N 5/64; H04W 4/80
USPC ....................................................... 340/815.4
See application file for complete search history.

(56) References Cited

U.S. PATENT DOCUMENTS 6,611,297 B1 8/2003 Akashi et al.
6,657,548 B2 12/2003 Dai
(Continued)

FOREIGN PATENT DOCUMENTS

CN 102714907 10/2012
CN 101649967 4/2013
(Continued)

OTHER PUBLICATIONS

Sony Electronics "Sony FM/AM Clock Radio: IFC-C717PJ Dream Machine", Technical Report, May 10, 2010, pp. 1-2.
(Continued)

*Primary Examiner* — Kam Wan Ma
(74) *Attorney, Agent, or Firm* — Byrne Poh LLP

(57) ABSTRACT

Systems, methods, and media for projecting light to indicate a device status are provided. In accordance with some implementations of the disclosed subject matter, systems for projecting light to indicate a device status are provided, the systems comprising: a hardware processor that: determines a light status; determines whether to turn a light source on; selects a light format corresponding to the light status; projects light of a light source according to the light format; and determines whether to turn the light source off.

15 Claims, 7 Drawing Sheets

Related U.S. Application Data continuation of application No. 15/432,688, filed on Feb. 14, 2017, now Pat. No. 10,121,334, which is a continuation of application No. 14/337,943, filed on Jul. 22, 2014, now Pat. No. 9,607,487.

(60) Provisional application No. 61/857,025, filed on Jul. 22, 2013.

(51) Int. Cl.
*G08B 7/06* (2006.01)
*H04W 4/80* (2018.01)
*H04W 8/00* (2009.01)

(56) References Cited

U.S. PATENT DOCUMENTS

| | | |
|---|---|---|
| 6,798,720 B2 | 9/2004 | Haupt et al. |
| 6,894,623 B2 | 5/2005 | Hama et al. |
| 7,149,152 B1 | 12/2006 | Chan |
| 7,564,368 B2 | 7/2009 | Segall |
| 7,654,858 B2 | 2/2010 | Geiger |
| 8,284,631 B2 | 10/2012 | Cho et al. |
| 8,297,758 B2 | 10/2012 | Choi et al. |
| 9,224,290 B1 | 12/2015 | Mason et al. |
| 9,607,487 B2 | 3/2017 | Dureau |
| 10,121,334 B2 | 11/2018 | Dureau |
| 2003/0206494 A1 | 11/2003 | Haupt et al. |
| 2006/0282204 A1 | 12/2006 | Breed |
| 2007/0258243 A1 | 11/2007 | Segall |
| 2008/0180654 A1 | 7/2008 | Bathiche et al. |
| 2008/0218328 A1 | 9/2008 | Chiu |
| 2010/0026707 A1 | 2/2010 | Hoogenstraaten et al. |
| 2010/0053475 A1 | 3/2010 | Han et al. |
| 2010/0097212 A1 | 4/2010 | Wingate et al. |
| 2010/0289664 A1 | 11/2010 | Mizushima et al. |
| 2011/0141856 A1 | 6/2011 | Cho et al. |
| 2011/0167357 A1 | 7/2011 | Benjamin et al. |
| 2012/0048841 A1 | 3/2012 | Asofsky et al. |
| 2012/0092183 A1 | 4/2012 | Corbett et al. |
| 2012/0098673 A1 | 4/2012 | Ramones et al. |
| 2012/0188105 A1 | 7/2012 | Khaled et al. |
| 2012/0287334 A1 | 11/2012 | Feri et al. |
| 2013/0187785 A1 | 7/2013 | McIntosh et al. |
| 2014/0300457 A1 | 10/2014 | Geerlings |
| 2015/0022370 A1 | 1/2015 | Dureau |
| 2017/0162008 A1 | 6/2017 | Dureau |

FOREIGN PATENT DOCUMENTS

| | | |
|---|---|---|
| CN | 103090461 | 5/2013 |
| JP | 2010512677 | 4/2010 |
| KR | 20080099352 | 11/2008 |
| WO | WO 2004094896 | 11/2004 |
| WO | WO 2005060309 | 6/2005 |
| WO | WO 2008072152 | 6/2008 |
| WO | WO 2011092619 | 8/2011 |
| WO | WO 2011109897 | 9/2011 |

OTHER PUBLICATIONS

Barry, K., "Bosch Unveils All-New Dishwasher Lineup", in Reviewed.com, May 15, 2013, pp. 1-3, available at: http://dishwashers.reviewed.com/news/bosch-unveils-all-new-dishwasher-lineup.
Examination Report dated Oct. 23, 2017 in EP Patent Application No. 14748430.7.
International Search Report and Written Opinion dated Oct. 7, 2014 in International Patent Application No. PCT/US2014/047628.
Notice of Allowance dated Apr. 17, 2019 in U.S. Appl. No. 16/174,773.
Notice of Allowance dated Jun. 27, 2018 in U.S. Appl. No. 15/432,688.
Notice of Allowance dated Nov. 17, 2016 in U.S. Appl. No. 14/337,943.
Office Action dated Jan. 14, 2016 in U.S. Appl. No. 14/337,943.
Office Action dated Apr. 3, 2018 in CN Patent Application No. 201480049905.6.
Office Action dated Apr. 13, 2016 in U.S. Appl. No. 14/337,943.
Office Action dated May 12, 2015 in U.S. Appl. No. 14/337,943.
Office Action dated Aug. 11, 2016 in U.S. Appl. No. 14/337,943.
Office Action dated Aug. 16, 2018 in KR Patent Application No. 10-2016-7003256.
Office Action dated Nov. 13, 2014 in U.S. Appl. No. 14/337,943.
Office Action dated Dec. 28, 2018 in U.S. Appl. No. 16/174,773.
Zahnzinger, M., "Bosh's New Dishwasher Design: A Laser Light Show", in Reviewed.com, Sep. 2, 2012, pp. 1-3, available at: http://dishwashers.reviewed.com/features/bosch-s-new-dishwasher-design-a-laser-light-show.

METHODS, SYSTEMS, AND MEDIA FOR PROJECTING LIGHT TO INDICATE A DEVICE STATUS

CROSS-REFERENCE TO RELATED APPLICATIONS

This application is a continuation of U.S. patent application Ser. No. 16/174,773, filed Oct. 30, 2018, which is a continuation of U.S. patent application Ser. No. 15/432,688, filed Feb. 14, 2017, which is a continuation of U.S. patent application Ser. No. 14/337,943, filed Jul. 22, 2014, which claims the benefit of U.S. Provisional Patent Application No. 61/857,025, filed Jul. 22, 2013, each of which is hereby incorporated by reference herein in its entirety.

TECHNICAL FIELD

The disclosed subject matter relates to methods, systems, and media for projecting light to indicate a device status.

BACKGROUND

Typically, media content streaming devices use lights or small screens on the front of the device to report status information to users. The smaller these devices are, the more likely they can be hidden behind a television. Unfortunately, users have to walk to the television to look behind the television in order to access the status of the device. However, looking behind a television to obtain status information is inconvenient and often considered to be an unacceptable option to users.

Accordingly, new mechanisms for projecting light to indicate a device status are desirable.

SUMMARY

Methods, systems, and media for projecting light to indicate a device status are provided. In some implementations, systems for projecting light to indicate a device status are provided, the systems comprising: a hardware processor that: determines a light status; determines whether to turn a light source on; selects a light format corresponding to the light status; projects light of a light source according to the light format; and determines whether to turn the light source off.

In some implementations, methods for projecting light to indicate a device status are provided, the methods comprising: determining a light status; determining whether to turn a light source on; selecting a light format corresponding to the light status; projecting light of a light source according to the light format; and determining whether to turn the light source off.

In some implementations, non-transitory computer-readable media are provided containing computer-executable instructions that, when executed by a hardware processor, cause the processor to perform a method for projecting light to indicate a device status are provided, the method comprising: determining a light status; determining whether to turn a light source on; selecting a light format corresponding to the light status; projecting light of a light source according to the light format; and determining whether to turn the light source off.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
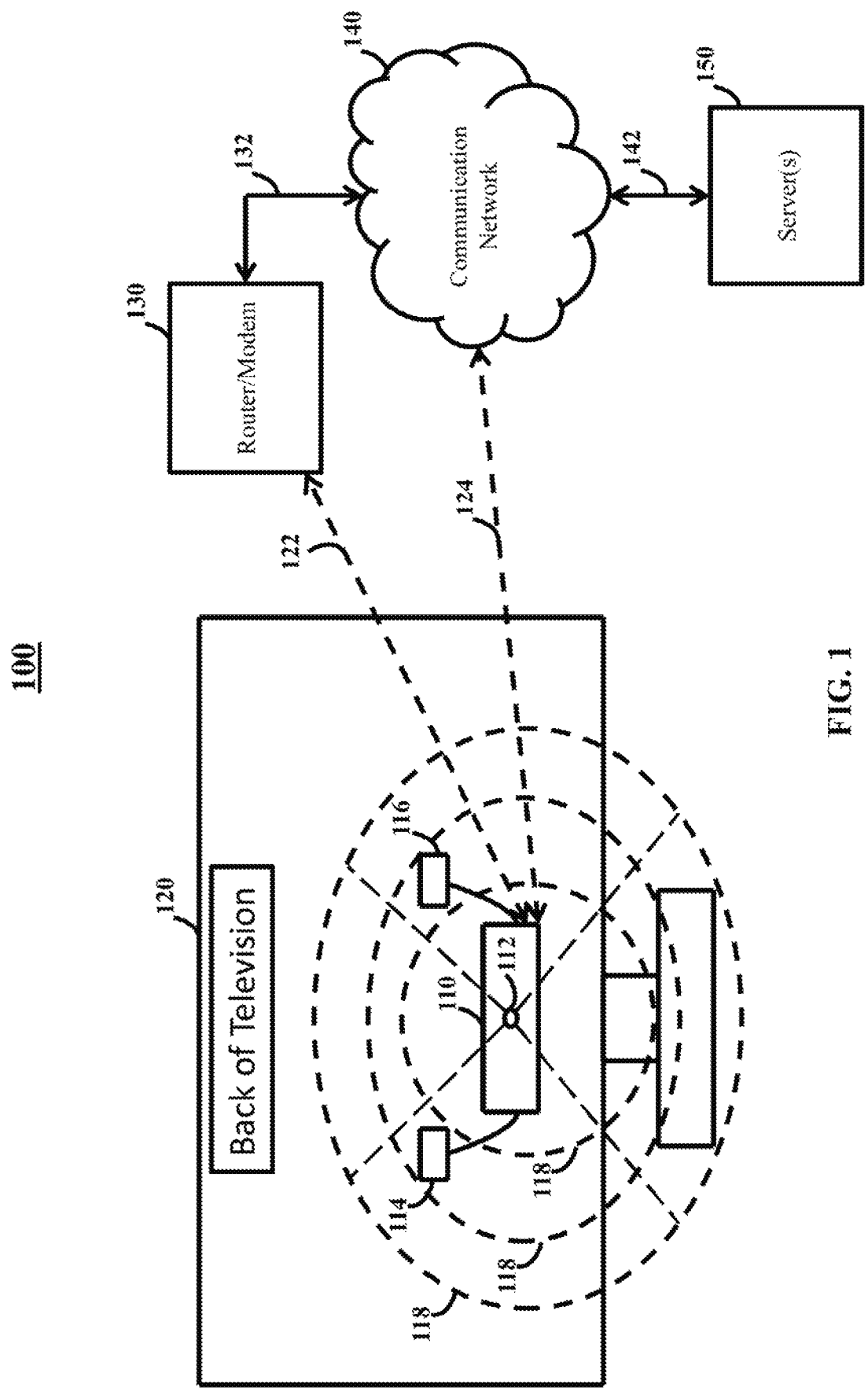
FIG. 1 is a back view of an example of a system for projecting light to indicate a device status in accordance with some implementations of the disclosed subject matter.

In accordance with various implementations, as described in more detail below, mechanisms, which can include methods, systems, and computer readable media, for projecting light to indicate a device status are provided. Generally speaking, these mechanisms can be used to indicate a light status for a media content streaming device.

In some implementations, the media content streaming device can be connected to a media content presentation device (e.g., a television) through one or more suitable communication interfaces. For example, the media content streaming device can be connected to the media content presentation device through a high-definition multimedia interface (HDMI) connection (e.g., via a suitable HDMI cable), a digital visual interface (DVI), a video graphics array (VGA), a RCA connector, a SCART connector, and/or any other suitable digital or analog video and/or audio interfaces. Additionally and/or alternatively, the media content streaming device can be connected to the media content presentation device through a universal serial bus (USB) interface (e.g., via a suitable USB cable).

In some implementations, the mechanisms can determine a light status of the media content streaming device. For example, the mechanism can determine a not-ready status, a network connection or other connection status, an error status, an idle status, and/or any other suitable status. Additionally, the mechanisms can determine whether to turn a light source on. For example, the light source can be a light-emitting diode (LED), a bulb, a wide dispersion bulb, a digital light projector, a laser, and/or any other suitable light source. In some implementations, the light source can have any suitable minimum output power level. For example, the light source can have a minimum output of 80 millicandelas.

In some implementations, the mechanisms can determine a light format corresponding to the light status. For example, the light format can be a light color, light pattern, a blinking light, an icon, text, and/or any other suitable light format. Additionally, the mechanisms can determine whether to control the direction of the light source.

In some implementations, the mechanisms can project the light source according to the light format to indicate the device status. For example, the media content streaming device can project the light source against a wall visible to a user. Additionally, after projecting the light source, the mechanisms can determine whether to turn the light source off.

The mechanisms can be used in a variety of applications. For example, these mechanisms can be used for projecting a light to indicate a device status, such as when a device is in a not-ready status. For example, the not-ready status can be a booting period, a shutting down period, an updating period, a downloading period, an uploading period, and/or any other suitable not-ready status. In some implementations, these mechanisms can be used for projecting light to indicate when the device has an active connection. For example, the active connection can be an active Internet connection, an active local area network (LAN) connection, and/or any other suitable high error rate or low bit rate connection. In some implementations, these mechanisms can be used for projecting light to indicate when the device has an error status. For example, the error status can be a lost LAN connection, a lost Internet connection, an internal malfunction, and/or any other suitable device status error. In some implementations, these mechanisms can be used to indicate device status when line of sight to the device is blocked (e.g., the device is behind a television) to a user.

These and other features for projecting light to indicate a device status are described further in connection with FIGS. 1-7.

Turning to FIG. 1, a back view of example 100 of a system for projecting light to indicate a device status in accordance with some implementations of the disclosed subject matter is shown. As illustrated, system 100 can include a media content streaming device 110, a media content presentation device 120, a router/modem 130, a communications network 140, and one or more servers 150.

In some implementations, media content streaming device 110 can be any suitable device that is capable of receiving, processing, converting, and/or rendering media content, such as a set-top box, a media receiver, a dongle, a game console, a laptop computer, a desktop computer, a tablet computer, a mobile phone, a gaming console, and/or any other suitable media content streaming device.

In some implementations, media content can include television programs, movies, cartoons, sports, music, sound effects, music videos, audio books, streaming live content, pay-per-view programs, on-demand programs, Internet content (e.g., streaming content, downloadable content, Webcasts, podcasts, Web pages, etc.), games, photos, video conferences, and/or any other suitable media content.

In some implementations, media content streaming device 110 can contain light source 112. For example, light source 112 can be a light-emitting diode (LED), a bulb, a wide dispersion bulb, a digital light projector, a laser, and/or any other suitable light source. Light source 112 can be internal or external to media content streaming device 110. In some implementations, light source 112 can project a light format (e.g., light color, light pattern, etc.) corresponding to a status (e.g., not-ready status, connection status, error status, etc.) of media content streaming device 110 (e.g., as described further in connection with FIG. 6 below, for example).

In some implementations, light source 112 can project light 118 in any suitable manner. For example, light source 112 can project light 118 in an equally distributive manner. In a more particular example, as shown in FIG. 1, light source 112 can project light 118 equally in a circular manner. In some implementation, light 118 can be a visible light having any suitable color(s), a laser light, and/or any other suitable light. Light source 112 can project light 118 against a wall visible to a user.

Figure 2:
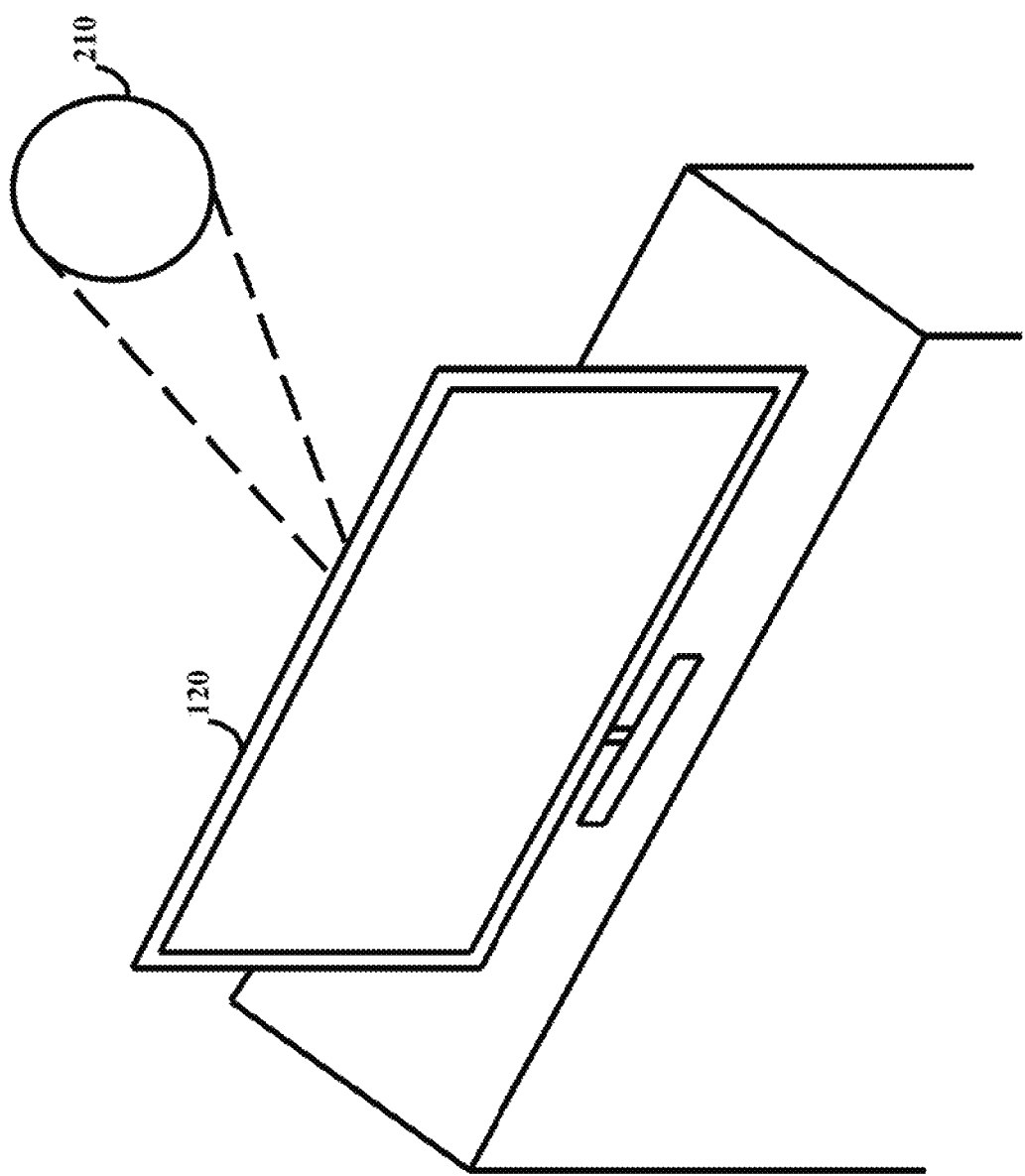
FIG. 2 is a perspective view of an example of a system for projecting light to indicate a device status in accordance with some implementations of the disclosed subject matter.

Additionally and/or alternatively, as shown in FIG. 2, a side view of an example 200 of a system for projecting light to indicate a device status in accordance with some implementations of the disclosed subject matter is shown. In some implementations, light source 112 can project light 210 in a focused manner. For example, as shown in FIG. 2, light source 112 can project light 210 against a wall, a ceiling, and/or in any other suitable location. This wall can be any suitable distance from the light source. For example, the wall can be in a close proximity of the light source and/or a media content presentation device associated with the light source. Light 210 can be any suitable shape, color, pattern, text, number, symbol, etc. of light that is visible to a user. For example, light 210 can be a circle, a square, a dot, a rectangle, and/or any other visible shape to the user. In some implementations, light source 112 can project an image on the wall. For example, light source 112 can project a progress bar on the wall. In some implementations, light source 112 can project a text on the wall. For example, light source 112 can project the light status on the wall as one or more pieces of text. In a more particular example, light source 112 can project the text "loading" on the wall. In another particular example, light source 112 can project the text "active" on the wall. In yet another particular example, light source 112 can project the text "error" on the wall.

Figure 3:
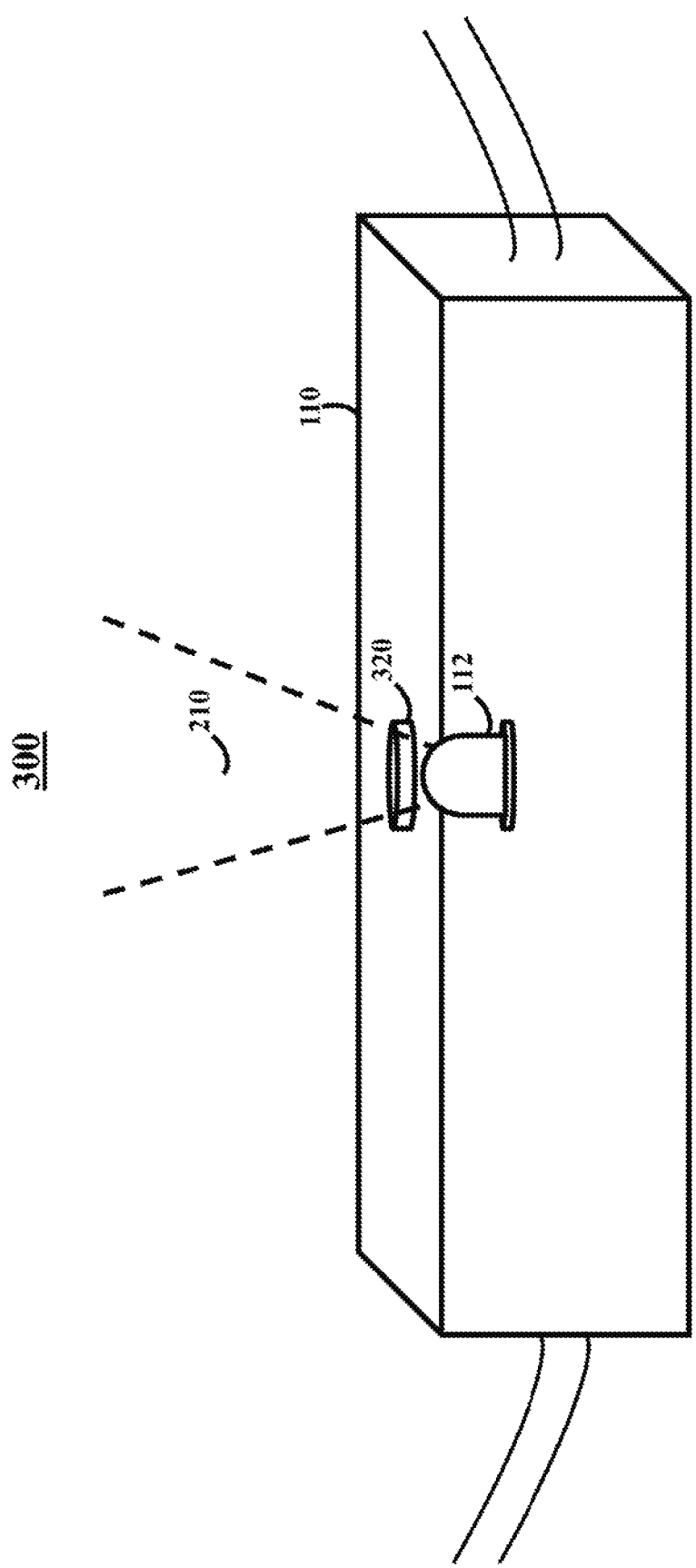
FIG. 3 is an another example of a system for projecting light to indicate a device status that shows a light source and a lens in accordance with some implementations of the disclosed subject matter.

In some implementations, as shown in FIG. 3, light source 112 (e.g., an LED, a bulb, etc.) can project light 210 using lens 320. In some implementations, lens 320 can be any suitable lens. For example, lens 320 can be a directional lens, a focusing lens, a plastic lens, a mirrored lens, and/or any other suitable lens. As shown in FIG. 3, light source 112 can project light 210 towards lens 320 and light 210 can pass through lens 320. In some implementations, lens 320 can narrow light 210 into a focused light against the wall, as shown in FIG. 2.

In some implementations, media content presentation device 120 can include and/or be coupled to one or more suitable sensors that can detect the presence of a user and/or a mobile device in a proximity of media content presentation device 120. For example, the sensor(s) can include a motion sensor that can detect a user in a proximity of media content presentation device 120. As another example, the sensor(s) can include a wireless sensor that can detect the presence of a mobile device (e.g., a mobile phone, a laptop computer, a tablet computer, a wearable computer, etc.) that is connected to a given network (e.g., a Wi-Fi network) and/or a mobile device that is in a proximity of media content presentation device 120 (e.g., using a BLUETOOTH LE sensor). As yet another example, the sensor(s) can include an audio sensor (e.g., a microphone, a sound level meter, etc.) that can measure the ambient noise level in a proximity of media content presentation device 120. In some implementations, media content presentation device 120 can adjust the intensity of light 210 based on the presence of a user and/or a mobile device in a predetermined proximity of media content presentation device 120 (e.g., a room). For example, light 210 can be turned on in response to detecting the presence of one or more users and/or mobile devices (e.g., a predetermined number of users and/or mobile devices, predetermined users and/or mobile devices, etc.) in the predetermined proximity of media content presentation device 120. As another example, light 210 can be turned off in response to detecting that one or more users and/or mobile devices (e.g., a predetermined number of users and/or mobile devices, predetermined users and/or mobile devices, etc.) have left the predetermined proximity of media content presentation device 120.

In some implementations, media content presentation device 120 can include any suitable light sensor. For example, the light sensor can detect an intensity of ambient light surrounding media content presentation device 120. In some implementations, light source 112 can adjust the intensity of light 210 based on the intensity of the ambient light. For example, light source 112 can project a low power light if the ambient light is low (e.g., in a dark room). Alternatively, light source 112 can project a high power light if the ambient light is high (e.g., in a bright room). In some implementations, media content presentation device 120 can disable light 210 in response to determining that a user in a proximity to media content presentation device 120 is asleep. In some implementations, this determination can be made using an internal clock of media content presentation device 120. In some implementations, media content presentation device 120 can be connected to another device (e.g., a fitness band, a mobile phone, a tablet computer, a wearable computer, and/or any other suitable device) to determine whether one or more users in a proximity of media content presentation device 120 are asleep.

Turning back to FIG. 1, media content presentation device 120 can be any suitable device that is capable of receiving, converting, processing, and/or displaying media content, such as a television, streaming media player, a media center computer, a cathode ray tube (CRT) display, a liquid-crystal display (LCD), a light-emitting diode (LED) display, a plasma display, a touch-screen display, a simulated touch screen, a tablet user device, a mobile phone, a gaming console, etc. In some implementations, media content presentation device 120 can be three-dimensional capable.

In some implementations, media content presentation device 120 (e.g., a television) can include high-definition multimedia interface (HDMI) port 114 and universal serial bus (USB) port 116.

In some implementations, media content streaming device 110 can be connected to media content presentation device 120 through a USB interface. For example, as shown in FIG. 1, media content screaming device 110 can be connected to USB port 116 through a suitable USB cable. In some implementations, media content streaming device 110 can draw power from media content presentation device 120 through the USB connection.

In some implementations, media content streaming device 110 can be connected to media content presentation device 120 through an HDMI connection. For example, as shown in FIG. 1, media content streaming device 110 can be connected to HDMI port 114 through a suitable HDMI cable. In some implementations, the media content streaming device can provide the media content presentation device with suitable media content (e.g., video content, audio content, etc.) through the HDMI connection. In some implementations, media content streaming device 110 can also draw power from media content presentation device 120 through the HDMI connection. In a more particular example, media content presentation device 120 can provide power to media content streaming device 110 through a Mobile High-Definition Link (MHL).

In some implementations, communications network 140 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a 3G network, a 4G network, or any other suitable communication network, or any combination of any of such networks.

Media content streaming device 110, router/modem 130, and server(s) 150 can be connected to communications network 140 through communications links 122, 124, 132, and 142, respectively. Communication links 122, 124, 132, and 142 can be any suitable communication links, such as network links, dial-up links, wireless links, hard-wired links, any other suitable communication links, or a combination of such links. In some implementations, media content streaming device 110 can be connected to router/modem 130 via communication 122. Router/modem 130 can be connected to server(s) 150 through communication network 140 via communication links 132 and 142, respectively. In some implementations, media content streaming device 110 can be connected to server(s) 150 through communication network 140 via communication links 124 and 142, respectively.

Media content streaming device 110, router/modem 130, and server(s) 150 may be located at any suitable location(s). For example, media content streaming device 110 and router/modem 130 may be located at a user's home and/or any other suitable location.

Server(s) 150 can be any suitable server for providing media content, and/or for performing any other suitable functions. Server(s) 150 can be implemented using any suitable components. For example, each of the server(s) 150 can be implemented as a media server, a computer, a data processing device, etc., or a combination of such devices.

Each of media content streaming device 110, media content presentation device 120, and server 150 can include and/or be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. Moreover, each of media content streaming device 110, media content presentation device 120, and server 150 can include a hard drive, a digital video recorder, a solid state storage device, a removable storage device, and/or any other suitable storage device. Each of media content streaming device 110, media content presentation device 120, and server 150 can be implemented as a stand-alone device or integrated with other components of system 100.

Figure 4:
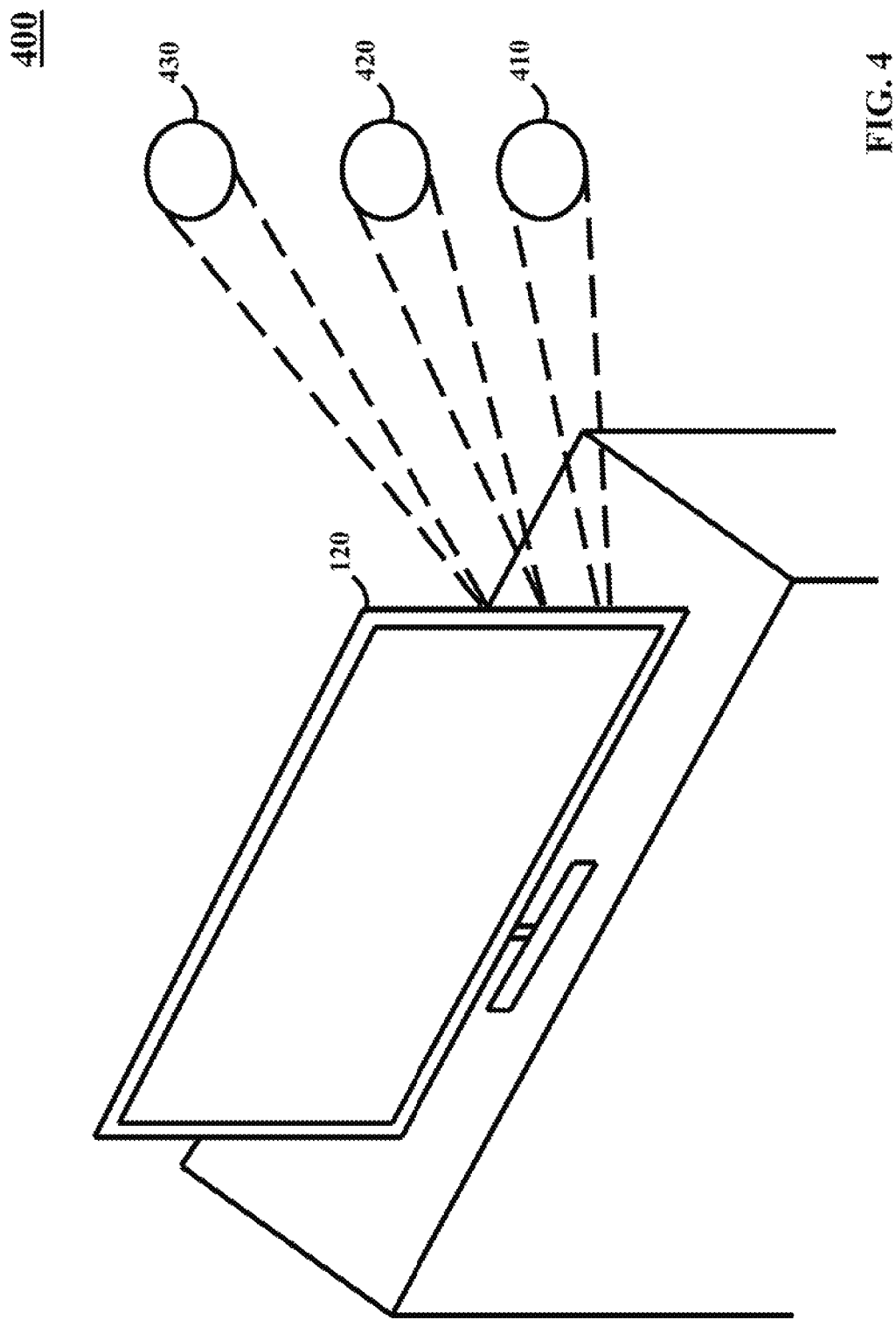
FIG. 4 is an example of a system for controlling the direction of a light source to indicate a device status in accordance with some implementations of the disclosed subject matter.

Turning to FIG. 4, an example 400 of a system for controlling the direction of a light source to indicate a device status in accordance with some implementations of the disclosed subject matter is shown. As illustrated, system 400 can include light 410, light 420, and light 430.

In some implementations, media content streaming device 110 can project light in a plurality of directions. For example, as shown in FIG. 4, light source 112 (e.g., an LED, a bulb, etc.) can project light in three different directions. In a more particular example, light source 112 can project light 410, 420, and 430 towards the right side of media content presentation device 120 (e.g., a television).

In some implementations, each light 410, 420, and 430, can correspond to a particular light status and a particular light format. For example, light 410 can correspond to a connection status, such as a LAN connection, an Internet connection, a Bluetooth connection and/or any other suitable connection status. Additionally, the connection status can correspond to a green light. Light 420 can correspond to a not-ready status, such as a booting period, a shutting down period, an updating period, a downloading period, an uploading period, and/or any other suitable not-ready status. Additionally, the not-ready status can correspond to a yellow light. Light 430 can correspond to an error status, such as a lost LAN connection, a lost Internet connection, an internal malfunction, an overheating status, and/or any other suitable error status. Additionally, the error status can correspond to a red light.

In some implementations, light source 112 can project light at any suitable angle using any suitable technique. In some implementations, a user can manually adjust the direction of the light. For example, turning back to FIG. 3, lens 320 can be manually adjustable to control the direction of the projected light. In a more particular example, the user can manually adjust the direction of the projected light by turning the lens in any suitable direction. In some implementations, lens 320 can have elevated ridges to allow the user to grip lens 320. For example, lens 320 can be a knob to control the direction of the light. In another example, media content streaming device 110 can include a knob that controls the direction of the lens via a mechanical interface.

In some implementations, the media content streaming device can present a menu interface to receive configuration settings from a user. For example, the media content streaming device can present a prompt to receive control settings from the user. In a more particular example, the user can control the menu interface using a user input interface that controls settings that control an electromechanical interface (e.g., a servo) that controls the direction of the light. The user input interface can be a remote control, a keyboard, a touchpad, a mobile phone, a gaming controller, and/or any other suitable user input interface.

In some implementations, the menu interface can include prompts to change the light source settings. For example, the media content streaming device can present a prompt to receive a directional input from the user to adjust the direction of the light. In a more particular example, the menu interface can have directional options, such as "lower right," "middle right," "upper right," "lower left," "middle left," "upper left," and/or any other suitable directionally option.

Additionally, the menu can include light format settings. For example, the light format settings can include timing information related to projecting a light. In a more particular example, the media content streaming device can prompt a user to set one or more times, time intervals, and/or any other suitable timing information that can define a period of time during which the function of projecting a light can be disabled (e.g., when a user is sleeping). As another example, the media content streaming device can prompt a user to set one or more events and can project, adjust, and/or turn off a light based on the occurrences of the events. In a more particular example, the events can include detecting the presence of a predetermined number of users and/or mobile devices in a predetermined proximity of the media content streaming device (e.g., zero, one, two, and/or any other suitable number). In another more particular example, the events can include detecting the presence of one or more predetermined users and/or mobile devices. In yet another more particular example, the events can include detecting that one or more users and/or mobile devices have left a predetermined proximity of the media content streaming device. As yet another example, the media content streaming device can present a prompt to receive a light selection from a user. For example, the light selection can be a particular light format (e.g., color, pattern, etc.) corresponding to a light status (e.g., not-ready status, connection status, etc.). In a more particular example, the light selection can be a green light to correspond with an active connection status. In yet another particular example, the light selection can be a red light to correspond with an error status. In some implementations, the light selection can be an image. For example, the image can be a progress bar to be projected against a wall. In another example, the image can be a shape to be projected against the wall. In a more particular example, the shape can be a circle, a rectangle, a square, a triangle and/or any other suitable shape. In some implementations, the light selection can be a text. For example, the text can be the light status to be projected against the wall. In a more particular example, the text can be "loading," "active," "error," and/or any other suitable text. In some implementation, the menu interface can include default options. For example, each light status can correspond to a default light format.

Figure 5:
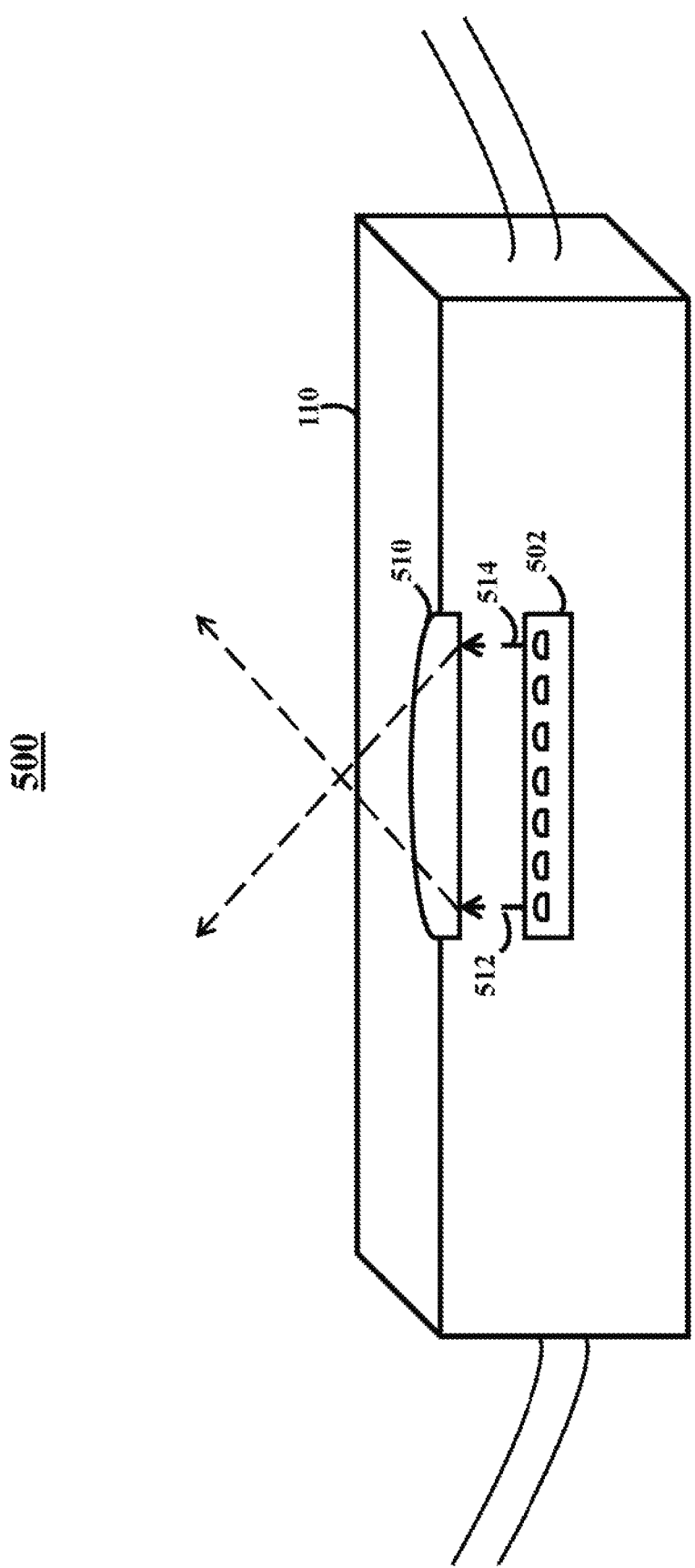
FIG. 5 is an another example of a system for controlling the direction of a light source to indicate a device status that shows multiple light sources and a lens in accordance with some implementations of the disclosed subject matter.

Turning to FIG. 5, an another example 500 of a system for controlling the direction of a light source to indicate a device status in accordance with some implementations of the disclosed subject matter is shown. As illustrated, system 500 can include media content streaming device 110, a light source 502, a lens 520, a light 512, and a light 514.

In some implementations, light source 502 can control the light in any suitable manner. For example, light source 502 can be any suitable directionally controllable light source. For example, light source 502 can be a digital light projector, an LCD display, a plasma display, an LED display, and/or any other suitable light source.

In some implementations, light source 502 can project light from a particular portion of light source 502. For example, as shown in FIG. 5, if the media content streaming device receives a directional input from a user to project light to the right, then light source 502 can project light 512 towards lens 510 by only projecting light on the left side of light source 502. Alternatively, if the media content streaming device receives a directional input from the user to project light to the left side, then light source 502 can project light 514 towards lens 510 by only projecting light on the right side of light source 502.

Figure 6:
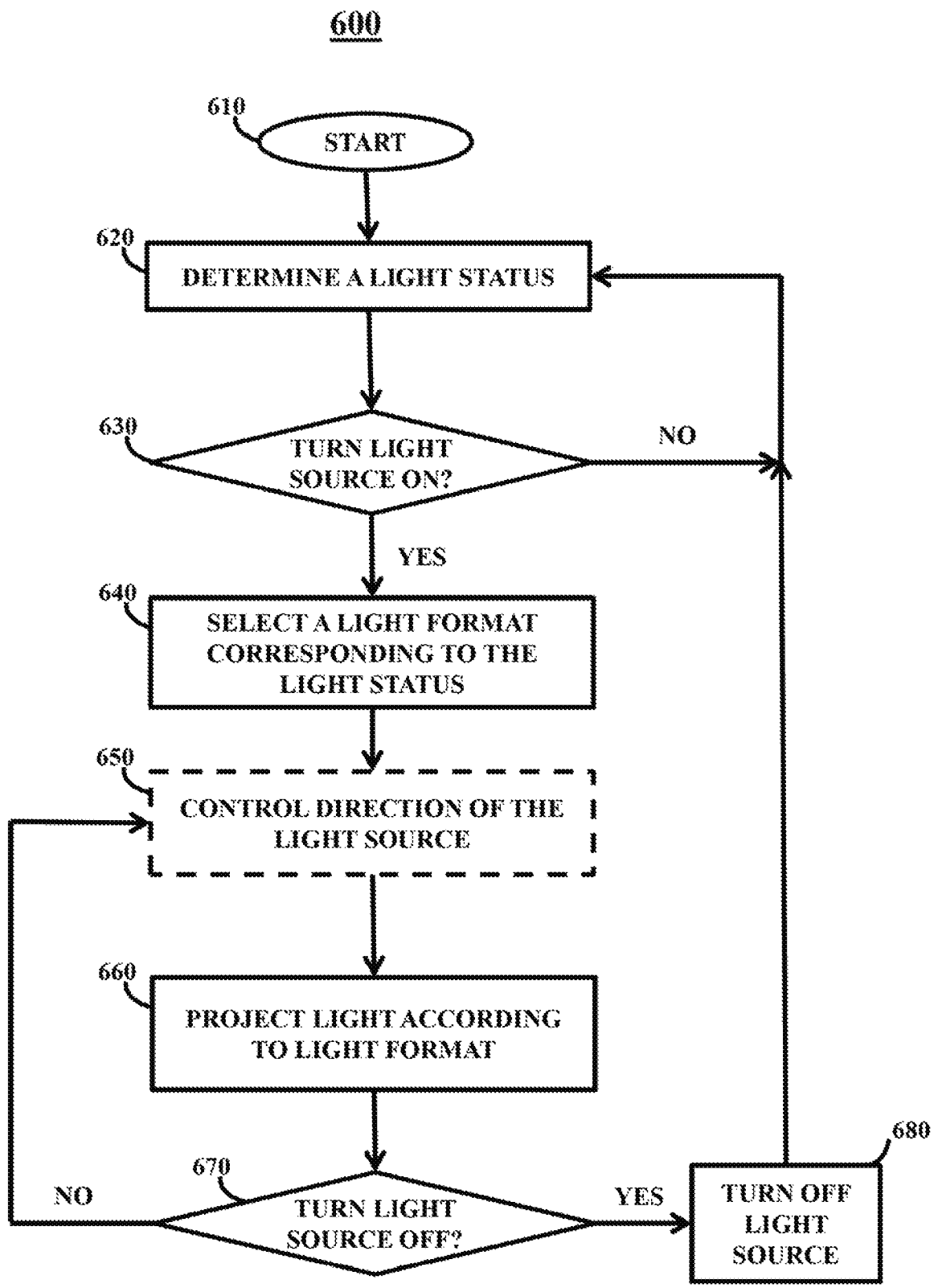
FIG. 6 is an example of a process for projecting light to indicate a device status in accordance with some implementations of the disclosed subject matter.

Turning to FIG. 6, a diagram illustrating an example 600 of a process that can be used for projecting light to indicate a device status in accordance with some implementations of the disclosed subject matter is shown. Process 600 can be performed in any suitable media content streaming device.

In some implementations, process 600 can start by determining a light status in any suitable manner at 620. In some implementations, the light status can reflect any suitable status. For example, the light status can indicate a not-ready status. In a more particular example, the not-ready status can reflect a booting period, a shutting down period, an updating period, a downloading period, an uploading period, and/or any other suitable not-ready status. In some implementations, the light status can indicate a connection status. For example, the connection status can reflect an established LAN connection, an established Internet connection, an established Bluetooth connection, and/or any other suitable connection status. In some implementations, the light status can indicate an error status. For example, the error status can reflect a lost LAN connection, a lost Internet connection, an internal malfunction, an overheating status, and/or any other suitable error status. In some implementations, the light status can indicate an idle status. For example, the idle status can reflect a sleeping status, a low power status, a queue status, and/or any other suitable idle status.

Turning back to FIG. 6, in response to determining the light status, the media content streaming device can determine whether to turn a light source on at 630. The light source can be an LED, a bulb, a wide dispersion bulb, a digital light projector, a laser, and/or any other suitable light source. If the media content streaming device determines to not turn the light source on, then process 600 can return to determining a light status at 620 until process 600 determines to turn the light source on.

In response to determining to turn the light source (e.g., an LED, a bulb, etc.) on, the media content streaming device can select a light format corresponding to the light status (e.g., a not-ready status, a connection status, etc.) at 640. In some implementations, the light format can be a light color, a light pattern, a blinking light, and/or any other suitable light format.

In some implementations, the light color can correspond to the light status. For example, each light color can correspond with a different light status. In a more particular example, an orange light can correspond to a not-ready status and/or a booting period. Additionally or alternatively, a yellow light can correspond to a not-ready status and/or a booting period. In another particular example, a green light can correspond to a period of time after the booting period and/or the not-ready status. The green light can also represent an active connection to the Internet, an active connection to another device, and/or any other active connection. In yet another example, a red light can correspond to a lost connection to the Internet, a lost connection to another device, an error status, and/or any other lost connection and/or error status. Additionally or alternatively, the red light can correspond to a powered off status.

In some implementations, the light pattern can correspond to a light status. For example, each light pattern can correspond to a different light status. In some implementations, a pattern of a flashing red light can correspond to an error. For example, the error can be a lost LAN connection, a lost Internet connection, an Internet malfunction, an overheating notification, and/or any other suitable error. In some implementations, a pattern of a flashing orange light can correspond to a loading period and/or a booting period of the media content streaming device. In some implementations, a pattern of a flashing green light can correspond to a completion of a loading period. For example, the pattern of the flashing green light can correspond to a media content streaming device finishing its booting period.

In some implementations, each light format (e.g., color, pattern, etc.) can correspond to a default light status. Additionally or alternatively, the media content streaming device can designate a particular light format corresponds to a particular light status based on previously entered configuration settings (e.g., as described above in connection with FIG. 3, for example).

After selecting a light format, the media content streaming device can control the direction of the light source at 650. For example, the media content streaming device can control the direction of the light source based on previously entered configuration settings (e.g., as describe above in connection with FIG. 3, for example).

In some implementations, the media content streaming device can project light according to the light format at 660 in any suitable manner. For example, the media content streaming device can project light using an LED, a bulb, a wide dispersion bulb, a digital light projector, a laser pointer, and/or any other suitable light source. In some implementations, the light source can project light through a lens (e.g., as described above in connection with FIGS. 2-5, for example).

In some implementations, after projecting light, the media content streaming device can determine whether to turn off the light source at 670. This determination can be made in any suitable manner. For example, it can be determined that the light source should be turned off after a particular time period (e.g., three seconds, five seconds, etc.). In some implementations, it can be determined that the light source should be turned off after the state that the media content streaming device is in has changed. For example, it can be determined that the light source should be turned off after the booting period is complete. In another example, it can be determined the light source should be turned off once there is an active connection (e.g., an active Internet connection, an active LAN connection, etc.). In some implementations, it can be determined that the light source should be turned off only in response to input from a user (e.g., using a remote control).

In response to determining to turn off the light source, process 600 can turn off the light source at 680 and loop back to 620 to determine a light status. The light source can be turned off at 680 in any suitable manner.

In response to determining to not turn off the light source, the media content streaming device can loop back to 650 to control the direction of the light source. For example, process 600 can select to change the direction of the light before turning the light source off.

It should be understood that the above steps of the flow diagrams of FIG. 6 can be executed or performed in any order or sequence not limited to the order and sequence shown and described. Also, some of the above steps of the flow diagram can be executed or performed substantially simultaneously where appropriate or in parallel to reduce latency and processing times.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 7:
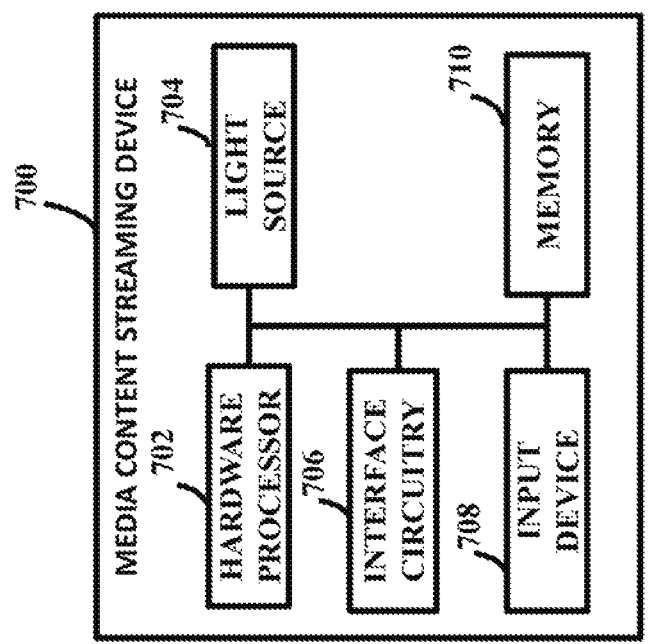
FIG. 7 is a generalized schematic diagram of an illustrative media content streaming device as provided, for example, in FIG. 1 in accordance with some implementations of the disclosed subject matter.

An example 700 of a media content streaming device, such as media content streaming device 110 of FIG. 1, is illustrated in FIG. 7. As shown, media content streaming device 700 may include a hardware processor 702, a light source 704, interface circuitry 706, an input device 708, and memory 710, which may be interconnected. In some implementations, memory 710 can contain a storage device for storing a computer program for controlling hardware processor 702 (which can be a microprocessor, digital signal processor, a controller, etc.).

Hardware processor 702 can use the computer program to present on an external display data received through interface circuitry 706. Input device 708 may be remote control interface to a remote control, a computer keyboard, a mouse, a cursor-controller, or any other suitable input mechanism.

In some implementations, interface circuitry 706 can include one or more suitable communication interfaces for interfacing with one or more communication networks and/or devices, such as Universal Serial Bus (USB) interfaces, High-Definition Multimedia Interfaces (HDMI), Wi-Fi interfaces, Ethernet interfaces, and/or any other suitable communication interfaces.

Light source 704 can be a light-emitting diode (LED), a bulb, a wide dispersion bulb, a digital light projector, a laser pointer, and/or any other suitable light source. Light source 704 can be external or internal to media content streaming device 102.

Although the mechanisms for projecting light to indicate a device status are described herein as being implemented on a media content streaming device, this is only illustrative. The mechanisms may be implemented on any suitable electronic device (e.g., a streaming device, a dongle, a television, a smart television, a set-top box, a personal computer ("PC"), a mainframe computer, a data display, a two-way pager, a wireless terminal, a portable telephone, a portable computer, a palmtop computer, an automobile PC, a laptop computer, a cellular phone, a personal digital assistant ("PDA"), a tablet computer, a smart phone, a combined cellular phone and PDA, and/or any other suitable electronic device) in some implementations.

Accordingly, methods, systems, and media for projecting light to indicate a device status are provided.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed implementations can be combined and rearranged in various ways.

What is claimed is:

1. A media content streaming device for projecting light to indicate device status information, the device comprising:
   a light source; and
   a hardware processor that is programmed to:
      determine a light status indicating a device status of the media content streaming device, wherein a light format corresponds to the light status;
      identify a direction that the light source having the light format is to be projected;
      cause light of the light source having the light format to be projected in the identified direction according to the light status;
      determine whether the light of the light source is to be turned off based on an updated device status of the media content streaming device; and
      in response to determining that the light of the light source is not to be turned off based on the updated device status of the media content streaming device, cause the light of the light source to be projected in a different direction from the identified direction.

2. The device of claim 1, wherein the light status includes a light color, wherein the light color corresponds to the light status.

3. The device of claim 1, wherein the light status includes a light pattern, wherein the light pattern corresponds to the light status.

4. The device of claim 1, wherein the hardware processor is further programmed to receive user configuration settings, wherein the light status is determined based on the user configuration settings.

5. The device of claim 1, wherein the hardware processor is further programmed to determine whether the light of the light source is to be turned on in response to determining the light status indicating the device status of the media content streaming device.

6. The device of claim 1, wherein the hardware processor is further programmed to determine whether the light of the light source is to be turned on based on a detection of a user in proximity to the media content streaming device.

7. The device of claim 1, wherein determining whether the light of the light source is to be turned off is based on determining whether the device status of the media content streaming device has changed.

8. A method for projecting light to indicate a device status of a media content streaming device, comprising:
   determining a light status indicating a device status of the media content streaming device, wherein a light format corresponds to the light status;
   identifying a direction that the light source having the light format is to be projected;
   causing light of the light source having the light format to be projected in the identified direction according to the light status;
   determining whether the light of the light source is to be turned off based on an updated device status of the media content streaming device; and
   in response to determining that the light of the light source is not to be turned off based on the updated device status of the media content streaming device, causing the light of the light source to be projected in a different direction from the identified direction.

9. The method of claim 8, wherein the light status includes a light color, wherein the light color corresponds to the light status.

10. The method of claim 8, wherein the light status includes a light pattern, wherein the light pattern corresponds to the light status.

11. The method of claim 8, further comprising receiving user configuration settings, wherein the light status is determined based on the user configuration settings.

12. The method of claim 8, further comprising determining whether the light of the light source is to be turned on in response to determining the light status indicating the device status of the media content streaming device.

13. The method of claim 8, further comprising determining whether the light of the light source is to be turned on based on a detection of a user in proximity to the media content streaming device.

14. The method of claim 8, wherein determining whether the light of the light source is to be turned off is based on determining whether the device status of the media content streaming device has changed.

15. A non-transitory computer-readable medium containing computer-executable instructions that, when executed by a processor, cause the processor to perform a method for projecting light to indicate a device status of a media content streaming device, the method comprising:

determining a light status indicating a device status of the media content streaming device, wherein a light format corresponds to the light status;

identifying a direction that the light source having the light format is to be projected;

causing light of the light source having the light format to be projected in the identified direction according to the light status;

determining whether the light of the light source is to be turned off based on an updated device status of the media content streaming device; and in response to determining that the light of the light source is not to be turned off based on the updated device status of the media content streaming device, causing the light of the light source to be projected in a different direction from the identified direction.

\* \* \* \* \*